Figure 1:
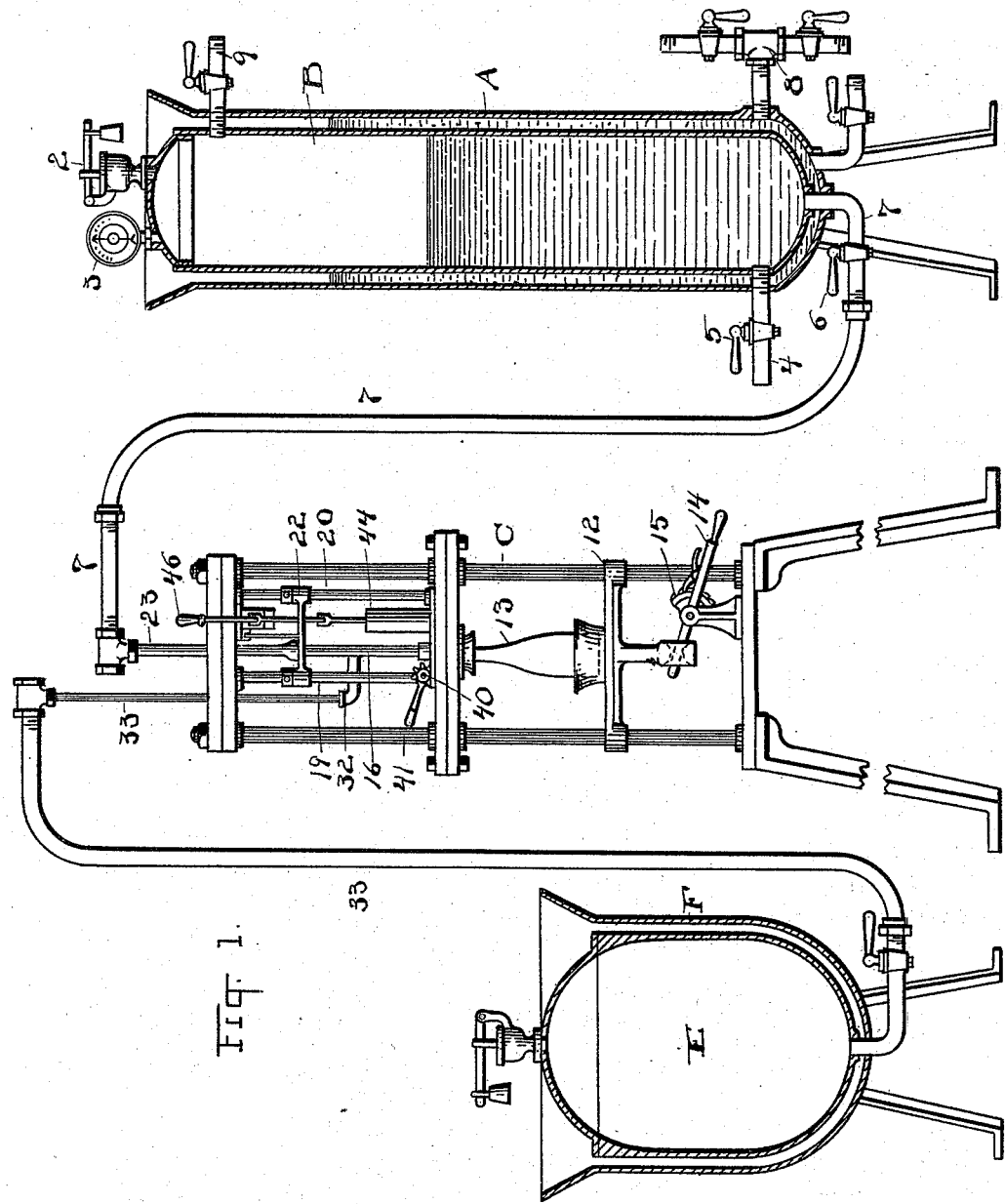

(No Model.) 3 Sheets—Sheet 1.

V. OPPL.
APPARATUS FOR BOTTLING BEER.

No. 530,600. Patented Dec. 11, 1894.

ATTEST.
R. B. Moser
G. L. Scharffer

INVENTOR.
Valentin Oppl
By H. J. Fisher ATTORNEY

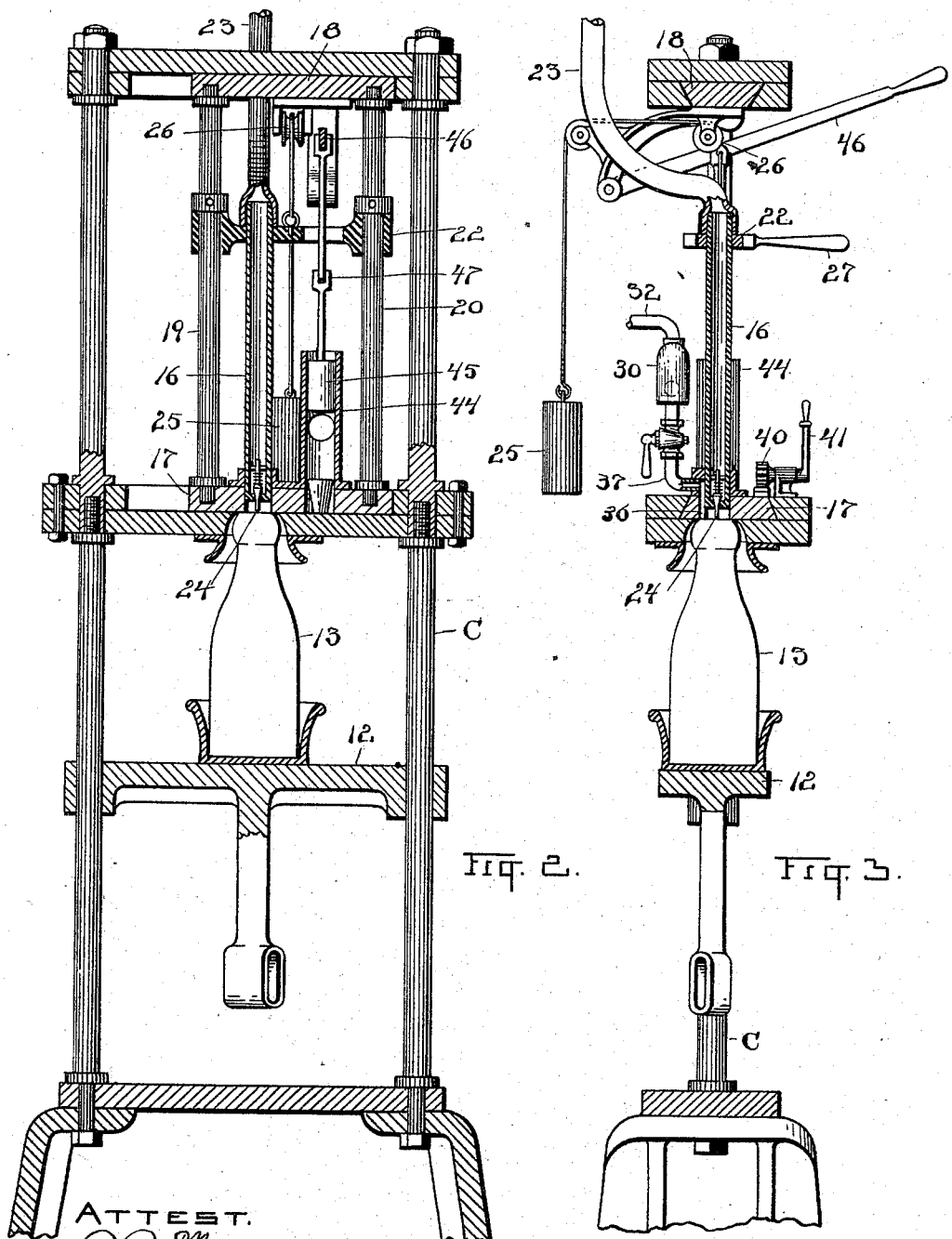

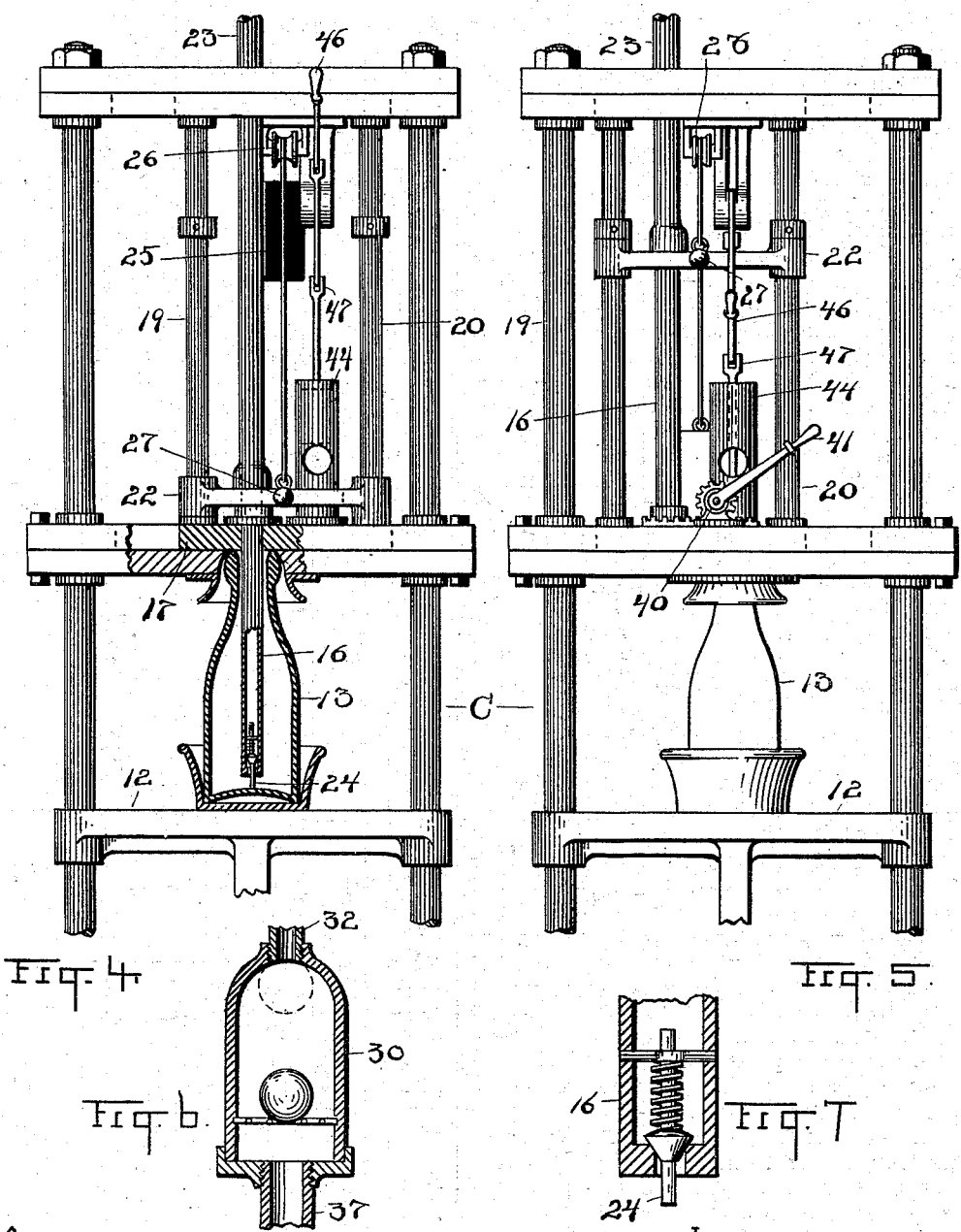

UNITED STATES PATENT OFFICE.

VALENTIN OPPL, OF CLEVELAND, OHIO.

APPARATUS FOR BOTTLING BEER.

SPECIFICATION forming part of Letters Patent No. 530,600, dated December 11, 1894.

Application filed June 15, 1894. Serial No. 514,653. (No model.)

*To all whom it may concern:*

Be it known that I, VALENTIN OPPL, a citizen of the United States, residing at Cleveland, in the county of Cuyahoga and State of Ohio, have invented certain new and useful Improvements in Apparatus for Bottling Beer; and I do hereby declare that the following is a full, clear, and exact description of the invention, which will enable others skilled in the art to which it appertains to make and use the same.

My invention relates to an apparatus for bottling beer, and the invention consists in the construction of apparatus substantially as shown and described and particularly pointed out in the claims.

In the accompanying drawings, Figure 1 is an elevation partly in section of a complete bottling apparatus comprising the bottling machine in the center of the figure in plain elevation and a central vertical sectional elevation of the pressure tank at the right and a supplemental pressure at the left, all as hereinafter more fully described. Fig. 2 is a vertical central elevation of the bottling machine itself, and enlarged as compared with Fig. 1, and Fig. 3 is a vertical central sectional elevation at right angles to Fig. 2. Fig. 4 is an enlarged elevation partly in section of the upper part of the bottling machine and showing the supply tube down in the bottom instead of being raised as in Figs. 2 and 3. Fig. 5 is an elevation of the upper part of the machine with the supply tube and its operating mechanism in a raised position and showing the corking device for corking the bottle. Fig. 6 is an enlarged vertical sectional elevation of the glass observation chamber through which the overflowing of the filled bottle is detected, as shown in relation in Fig. 3, and serving as hereinafter more fully described. Fig. 7 is an enlarged sectional elevation of the lower end of the supply or filling tube which enters the bottle.

In the bottling of beer as carried on prior to my invention, it has been customary to first fill the bottles and cork them and then subject them to hot water or steam heat. This necessitated the double handling of bottles and the placing and replacing of them in the heater and then removing them therefrom, and entailed much hand labor and incidental expense. I have discovered that the beer can as well be heated before bottling as afterward, and have invented the means herein described of heating the beer in a large tank and then drawing the beer off and bottling as the last act in the operation. To do this it is necessary of course that the beer be kept under pressure from the time that it leaves the tank until it has been corked, and the construction herein shown and described makes provision for this necessity.

Referring now to Fig. 1, at the right I have two tanks A and B. The tank A is an outside tank tubular in general outline, and in this tank is supported the tank B of such smaller dimensions than tank A as to leave a water jacket between the two. As shown here, tank A is closed at the bottom and open at the top, and tank B is closed at both ends and has a safety valve —2— in its top whereby the degree of pressure in the tank may be regulated, and the pressure gage —3— tells the amount of pressure in the tank. This inside tank B contains the beer which is supplied through the union —4— at its bottom, having a valve —5— to open or close the beer passage, and a valve —6— controls the discharge through pipe or tube —7—. The outer tank A has a joint —8— with valves and double pipe connection at its bottom through which steam is admitted to heat the water which is contained in the water jacket between the two tanks A and B, and then cold water is admitted through the other pipe to cool the beer. The beer having been heated by this apparatus or by equivalent apparatus or means, to say 200° Fahrenheit to prevent fermentation in the bottles it is then cooled in the same tank when it is ready for bottling. When this occurs I introduce atmospheric or equivalent pressure into the top of tank B through the pipe —9— and maintain such pressure therein as may be found necessary to do the work. Now having the beer in readiness in this way and under pressure and having opened the valve —6—, the beer may flow to the bottling machine. This machine has a suitable frame C, and upon its uprights in the lower section of the frame is a vertical movable or sliding table or support —12— for the bottle —13— which is to be filled. A lever —14— having pawl and ratchet mechanism —15— serves to raise and lower the sliding support —12— for the bottle to bring the bottle up into filling position and to lower it for removal.

Having the bottle in raised position as seen for example in Figs. 1, 2 and 3, it is in position to receive the beer supply pipe —16— extending down from the top of the machine and supported in a transversely sliding frame consisting of the bottom or lower part —17— and the upper part —18— and two vertical posts —19— and —20—. The parts —17— and —18— have beveled edges, as clearly seen in Fig. 3, and sliding in corresponding guide-ways in the cross-bars of the main frame. The supply or filling tube —16— is adapted to slide up and down in the frame just described, and is held at its upper end in a vertically sliding cross-bar —22— having eyes at its ends adapted to slide on the posts —19— and —20—. A flexible tube —23— makes the connection between the supply pipe —7—, Fig. 1, and the filling pipe —16—.

The filling pipe —16— has a spring pressed valve —24—, Fig. 7, in its bottom, the said valve having a spindle extending below the tube so that when the tube is extended down into the bottom of the bottle by sliding the tube and its cross-bar —22— down, as seen in Fig. 4, the valve —24— will be forced open and the beer permitted to pass into the bottle. The tube —16— and its connected parts are provided with a counterweight —25— having a chain over a sheave —26— and said chain or rope is connected with the top sliding bar —22— so that there will be practically an equilibrium obtained between the parts, and the said tube will be easily slid into raised or lowered position by means of the handle —27—, Fig. 3.

When the bottle has been filled the operator receives notice thereof through the glass bulb —30— shown enlarged in Fig. 6, but visible in Fig. 3. This bulb has a float and ball adapted at its top to close the pipe connection —32— when the beer rises in the bulb to float the ball. This pipe —32— discharges into the larger pipe —33— which descends thence into a supplemental pressure tank E, Fig. 1, having an outside containing tank F, said tanks resembling the tanks A and B substantially in their relation and operation. In this latter tank E, however, a comparatively light pressure is maintained, say, in the neighborhood of three or four pounds, as against, say, fifteen pounds in tank B, and it is intended to exert a back pressure in the glass bulb —30—.

Assuming now that a bottle has been filled with beer, as above described, and that the tube —16— remains down in the bottle, there will be an overflow if the supply be not cut off. It will also be noticed that the lower dove-tailed cross-piece —17— fits snugly over and upon the mouth of the bottle because it will be remembered that the filling is done under pressure, and there must be no escape or let down of the pressure while the filling proceeds, so that the filled bottle shall retain the pressure which is given it from the tank B. It will also be noticed that the tube —16— which extends down through the sliding piece —17— fits closely in said piece and may be packed about its sides, if necessary, to make a close fit, and that when it is withdrawn as in Fig. 2, the passage to the mouth of the bottle still is closed from the outside atmosphere as it should be. The operator keeps his eye on the glass bulb —30— and when he sees the beer rising in that bulb he knows that the bottle is not only full, but overflowing, and referring to Fig. 3, it will be seen that there is a slight side passage —36— at the side of the valved tube —16— through which the beer may rise into the short pipe —37— which enters the bottom of the bulb. When this occurs the supply of beer is cut off by raising the tube —16— and the automatic closing of its valve —24— and the said tube is withdrawn from the bottle as in Fig. 2 by simply lifting on the handle —27—, Fig. 3. Now, having withdrawn said tube —16—, the space it occupied in the bottle must be filled, and so it occurs that the surplus beer in the bulb —30— will run back through the channel in which it rose into the bulb and filled the bottle, and the back pressure from the tank or chamber E will contribute to maintain the pressure in the bottle, as hereinbefore described. The bottle being thus filled, it remains now to have it corked and ready to be dismissed. To effect the corking, I have provided the sliding bar —17— with a rack engaged by a pinion —40— and a lever —41— to operate the pinion. By this means I carry the frame which operates the sliding parts —17— and —18— and the supply tube —16— bodily to one side and bring the corking device over the bottle. This device consists in a tube —44— having a plunger —45— therein operated through a lever —46— and connecting rods —47—. This tube is shown here as having a hole in its side through which a cork is dropped into the bottom and is in position to be forced down into the mouth of the bottle. The bottle is removed by lowering it on its support —12— and another bottle is put in its place and the operation is thus continued.

It will be seen by the foregoing arrangement of parts of the apparatus that the beer goes from the tank B to the bottle cooled, and that cold beer which has previously been heated is bottled. Heretofore the bottling has all been done first and the beer was heated afterward.

While I have shown and described certain forms of different parts of the apparatus, I do not wish to be understood that I am confined to the particular forms of those parts as shown, but that I may alter their construction or operation more or less and retain the principles of the invention.

Having thus described my invention, what I claim is—

1. In a bottling machine, the main frame, a movable table to support the bottle, a lever to press the table and bottle upward and a lock for said lever and a sliding part —17— against which the mouth of the bottle is pressed by said table, thereby preventing outside overflow, in combination with the filling tube —16— constructed to enter the bottle and having a self-seating valve in its lower end, a flexible tubular supply connection —23— for said tube and a sliding frame in which said tube is raised and lowered and guideways to move said frame laterally, substantially as set forth.

2. The machine described having a part —17— against which the top of the bottle is tightly held to prevent leakage of liquid or gas, and means to hold the bottle in said position, in combination with a filling tube passing through part —17— into the bottle, an overflow tube —32— for the bottle, a transparent observation bulb into which the said tube discharges, and a pressure tank opening through the observation bulb into said tube, substantially as set forth.

3. The supporting frame, the bottle carrying table and the bar —17— supported in a horizontal guide way and provided with separate openings through which to fill and to cork the bottle respectively, mechanism to slide said bar from filling to corking position, and reversely, a cork containing tube and a plunger to force the cork into the bottle, substantially as set forth.

4. The machine described having a laterally sliding frame comprising uprights —19— and —20— and end pieces —17— and —18— and means to move said frame back and forth, in combination with a filling tube provided with a self-closing valve supported in said sliding frame by sliding cross-bar —22— and a flexible supply tube connected with the said filling tube, substantially as set forth.

5. The main frame and the sliding frame therein, consisting of the end pieces —17— and —18— and the supports —19— and —20—, in combination with corking mechanism carried by said sliding frame consisting in the cork holder —47— fixed to piece —17—, the plunger —45— therein, and the operating parts —46— and —47— connected with said plunger, substantially as set forth.

6. In beer bottling apparatus, a bottling machine constructed to prevent the escape of beer and gas from the bottle while bottling occurs, said construction consisting of a part having a close-fitting seat on its under side for the mouth of the bottle and mechanism to hold the bottle closely against said seat, a beer containing tank constructed to hold the beer under pressure, pipe connections from said tank to the mouth of the bottle to be filled, a back pressure tank and an open channel connection therefrom to the mouth of the bottle, whereby the overflowing beer is taken care of, substantially as set forth.

7. In a beer bottling apparatus, a tank constructed to contain the beer under pressure, in combination with a bottling machine constructed to close the mouth of the bottle while bottling occurs to prevent the escape of gas, and said mechanism consisting in a piece —17— against which the mouth of the bottle rests and a table to raise the bottle, and a supply tube sliding through said piece —17— into the bottle and having an opening in its lower end provided with a valve having a stem to strike the bottom of the bottle and open the valve and a spring to close the valve when the tube is raised, substantially as set forth.

Witness my hand to the foregoing specification.

VALENTIN OPPL.

Witnesses:
S. Q. KERRUISH,
GEORGIA SCHAEFFER.